United States Patent [19]

Leroux et al.

[11] Patent Number: 5,269,826
[45] Date of Patent: Dec. 14, 1993

[54] PROCESS FOR PRODUCING DECORATED GLASS-CERAMIC ARTICLES WITH TREATMENT WITH AN ACID PRIOR TO DECORATING AND DEVITRIFYING

[75] Inventors: Roland Leroux, Stadecken-Elsheim; Jürgen Thürk, Schornsheim; Vera Müller, Oppenheim, all of Fed. Rep. of Germany

[73] Assignee: Schott Glaswerke, Mainz, Fed. Rep. of Germany

[21] Appl. No.: 880,844

[22] Filed: May 11, 1992

[30] Foreign Application Priority Data

May 11, 1991 [DE] Fed. Rep. of Germany ........ 4115500

[51] Int. Cl.$^5$ .................. C03B 32/00; C03C 11/00
[52] U.S. Cl. .................. 65/30.1; 65/31; 65/33; 65/60.5; 65/60.53
[58] Field of Search .................. 65/60.5, 60.53, 33, 65/31, 30.1, 111

[56] References Cited

U.S. PATENT DOCUMENTS

| | | | |
|---|---|---|---|
| 3,775,154 | 11/1973 | Grego | 65/60.53 |
| 3,940,531 | 2/1976 | Demarest | 65/33 |
| 4,170,460 | 10/1979 | Donley | 65/60.53 |
| 4,192,666 | 3/1980 | Lupoi | 65/33 |
| 4,904,291 | 2/1990 | Siebers | 65/33 |

*Primary Examiner*—W. Gary Jones
*Assistant Examiner*—John Hoffmann
*Attorney, Agent, or Firm*—Millen, White, Zelano & Branigan

[57] ABSTRACT

A process for producing decorated glass-ceramic articles is described in which an article of crystallizable glass, prior to being decorated with a ceramic color and then converted into a glass-ceramic article by heat treatment with simultaneous burning-in of the ceramic color, is pre-heat treated with a Brönsted acid at temperatures between 50° and 800° C. until the surface layer of the glass article is modified so that the layer of ceramic color sinks into the surface of the article during burning-in/ceramicizing, thereby permitting if desired, a thicker layer of ceramic color to be applied and the production of decorated glass-ceramic articles in which the decoration is flush with the surface of the article to be produced, thereby reducing its susceptibility to damage and wear.

19 Claims, No Drawings a greater thickness. Because the layer thickness of the decoration colors is limited, frequent use of the stove burner plate cover result in the decoration being attacked by the chafing by the bottom of pans thereon or even abraded by it, since the pan bottom above all chafes to and fro on the raised surface of the decoration.

PROCESS FOR PRODUCING DECORATED GLASS-CERAMIC ARTICLES WITH TREATMENT WITH AN ACID PRIOR TO DECORATING AND DEVITRIFYING

BACKGROUND OF THE INVENTION

This invention relates to an improved process for producing decorated glass-ceramic articles in which an article of crystallizable glass which is decorated with ceramic color is converted into a glass-ceramic article by firing with simultaneous burning-in of the ceramic color.

Glass-ceramic articles, for example, stove burner covers, are decorated for aesthetic or also technical reasons, for example to mark cooking zones. For this purpose, a ceramic color is applied to the article by methods known per se, for example screen printing or the transfer image technique. The ceramic colors are glass-like, chemically fairly resistant, thin coating compositions, also called enamel colors, which are applied in a finely dispersed form, for example as a powder or suspension, to the article to be decorated and are fused to the surface to which it is applied by a heat treatment (burning-in) to give a color layer which firmly adheres to the thus decorated article. To save thermal energy, the procedure generally employed in the decoration of glass-ceramic articles is that the unfired glass article is decorated and the burning-in and the ceramicizing of the article is subsequently carried out simultaneously in one working. Such a process has been described, for example, in German Patent Specifications 3,505,922 and 3,600,109. The glass used for such a glass-ceramic article is, for example, a crystallizable glass from the Li$_2$O—Al$_2$O$_3$—SiO$_2$ system. Such glasses have a composition range, described for example, in U.S. Pat. Nos. 3,788,865 and 4,192,688, in % by weight, of 50–75 SiO$_2$, 16–35 Al$_2$O$_3$, 3–5.5 Li$_2$O and variable quantities of nucleating agents, the quantity of Li$_2$O+nucleating agent being at least 5.5% by weight. The nucleating agents used are 3–7 wt. % of TiO$_2$, 1.5–3 wt. % of ZrO$_2$ or 2–5 wt. % of P$_2$O$_5$. Minor quantities of alkaline earth metal oxides may also be present.

The ceramicizing of these glasses, i.e., the conversion of the glass composition into a glass ceramic, takes place under the conditions well known to those skilled in the art. Usually the glass is treated, as described, for example, in U.S. Pat. No. 4,192,688, for at least 15 minutes at a temperature which is 15° to 140° C. above the upper annealing point (glass viscosity=$10^{14}$ dP) for nucleation and then caused to crystallize at a temperature at least 190° C. above the upper annealing point for up to 10 hours. For optimized results, the precise temperature/time values must be experimentally determined for the particular glass ceramic, which determination is well within the scope of the normal capacity of a person of average skill in the art. The decoration applied to the glass body is burnt-in during this temperature treatment.

The burnt-in decoration color forms a layer on the glass-ceramic article. When decorated glass-ceramic plates are used as stove burner covers, the decorated layer cannot be made in any desired thickness, since the closest contact possible between the glass-ceramic plate and the bottom of the pan is to be provided. The effect of this limitation on the layer thickness is that it is no longer possible to use any desired colors for the decoration, especially those colors which have only a relatively weak hiding power and would therefore require It is an object of the invention to provide a process for producing decorated glass-ceramic articles, in which the decoration can also be applied in a greater thickness. It is another object to provide such a process in which the surface of the decoration is in substantially the same plane as the undecorated portions of the glass-ceramic article. Other objects will be apparent to those skilled in the art to which this invention pertains.

SUMMARY OF THE INVENTION

These objects are achieved by a process for producing a decorated glass-ceramic article in which an article of a crystallizable glass composition is decorated with ceramic color and is then converted into a glass-ceramic article by heat treatment with simultaneous burning-in of the ceramic color, which process comprises, as a preliminary step before decorating and firing the glass article, of treating the surface of the crystallizable glass with a Brönsted acid at a temperature between 50° C. and 800° C., for a period of time effective to cause the ceramic decorating color thereafter applied to the crystallizable glass article to sink into the surface of the glass article upon ceramization thereof.

DETAILED DESCRIPTION OF THE INVENTION

Surprisingly, it has been found that, if a glass article to be decorated with a ceramic color is treated with a Brönsted acid before decorating, the decorating ceramic sinks into the surface of the glass-ceramic article during the subsequent burning-in and ceramicizing process. Brönsted acids are those compounds which are capable of releasing protons, i.e., proton donors. Presumably, due to the reaction of the protons with the raw unfired glass surface, the latter is changed in its composition in such a way that, inter alia, the viscosity and/or the surface tension of a thin surface layer of the glass are lowered so that, during the burning-in of the color which takes place in the ceramicizing step, the color can sink into the glass matrix to the level of the adjacent area of the glass which was not decorated.

After ceramicizing, no adverse changes in the use properties of the glass-ceramic article, apart from the sunk-in decoration, are detectable when compared with an untreated glass article. The colors appear brilliant and sharply defined.

Suitable Brönsted acids are all substances releasing protons, for example mineral acids or acidic salts, and also other compounds containing protons, including water (under appropriate conditions).

The treatment of the raw (unfired) glass surface with the Brönsted acid can be carried out at temperatures just above room temperature (about 50° C.) up to the temperature of beginning crystallization (about 800° C.). The higher the temperature, the faster is the conversion of the surface layer of the glass. From practical aspects, however, a temperature range from 150° to 350° C. will normally be used. The time period required for the treatment depends above all on the reaction temperature. At a temperature range between 50° and 800° C., the period ranges from about 50 hours to 10 minutes, with higher temperatures requiring shorter treatment times. Within this time range, the composition of the surface of the glass is changed in such a way that the decoration can sink in to the glass substrate up to about 0.1 mm during burning-in. If greater depths of penetration are desired, longer treatment times are necessary. In the temperature range of 150° to 350° C., which is preferred for the treatment, the treatment time is in the range from 1 to 5 hours, which later achieves a depth of sinking of the decoration upon firing of 0.5 to 5 μm into the glass substrate.

The composition of the raw glass and the proton activity of the Brönsted acid, that is to say the nature and composition of the proton donor or proton donor mixture, also influences the optimum treatment time or the depth of sinking of the decoration. The treatment duration and time must therefore be optimized for each combination of substrate and Brönsted acid by a few simple preliminary tests.

In principle, the process is feasible with all proton donors. In practice, however, not all compounds can be sued equally well. For example, hydrochloric acid, which is a good proton donor, requires very long treatment times, since it provides a satisfactorily high proton concentration only at temperatures below the boiling point or decomposition point thereof. Other proton donors cannot conveniently be used in practice, because they are toxic and therefore require expensive protective measures, because they attack numerous glasses and/or the surface of numerous glasses (for example strong alkalis, some phosphates and fluorides and even clean water), because they have an unduly low proton activity and therefore require prolonged treatment times or because their residues are difficult to dispose of. If the proton donor activity is increased by raising the treatment temperature, the process frequently becomes so expensive (for example, when water or hydrochloric acid is used in an autoclave) that in general this approach will not be done in practice. A number of compounds are also less suitable for the reason that they start to decompose in the temperature range in which they evolve a satisfactory proton activity and thus require an adequately short reaction time.

Of the Brönsted acids, inter alia, sulfuric acid, sulfurous acid, ammonium sulphate, ammonium hydrogen sulphate and the alkali metal hydrogen sulphates have proved to be particularly suitable. Other suitable compounds to fit the desired process conditions, such as temperature and time, can easily be selected by routine preliminary firing tests.

The treatment of the raw glass article with the Brönsted acid can be carried out in any desired manner. In the case of mineral acids, for example sulfuric acid or nitric acid, the articles to be treated are dipped into the acid which has been heated and may even be boiling under reflux. More volatile acids, such as hydrochloric acid, can be used in an autoclave, as necessary, in order to increase the treatment temperature.

During the treatment with a Brönsted acid in the form of a salt, the article to be treated can be dipped into a melt of the salt, which is at the desired treatment temperature, and left there until the surface layer of the glass article has been converted sufficiently to achieve the desired depth of sinking. It is also possible, particularly when using salts, to coat the glass article to be treated with a layer of the particular salt or salt mixture and then hold the article at the desired treatment temperature until a degree of transformation which will achieve the desired later depth of sinking of the decoration has been reached. The coating of the glass article with the salt layer can, for example, be carried out by electrostatic means, or by any other desired method, for example, by evaporation of an aqueous, preferably saturated solution of the salt on the glass substrate. After the end of the treatment, the salt layer can be removed mechanically or washed off with water and the recovered salt or salt solution thus obtained can be re-used.

The duration of the treatment is preferably selected such that the surface layer of the glass article is converted to an extent such that a thickness of later applied decoration can completely sink into the surface of the glass article during the burning-in/ceramicizing treatment. This depth of sinking depends on the thickness of the decoration applied thereto. Usually, such decorations, especially if they are applied by the screen printing process, have thicknesses of about 0.5 to 10 μm, so that a typical decoration must sink into the surface of the glass article, to a corresponding depth. It is also possible, with a sufficient treatment, to cause the decoration to sink even more deeply, so that the surface of the decoration is below the surface of the decorated glass-ceramic surfaces. On the other hand, it is also possible to select treatment conditions such that a depth of sinking-in occurs that the decoration only partially sinks into the surface of the glass article. In this way, it is possible to ensure that, for example, in the case of glass-ceramic stove burner covers, the pan bottom still sits on the raised surface of the decoration as before, but very thick decoration layers can nevertheless be used. This embodiment, in which the decoration still protrude slightly beyond the surface of the glass ceramic plate, can be of advantage if a light glass ceramic is used which, as far as possible, is to be kept free of dark metal abraded from the cooking utensils.

After the treatment, the raw glass article is cooled if necessary, freed of the residual Brönsted acid, e.g., by washing, dried if necessary and then decorated in a known manner with the selected decoration color or colors, for example by screen printing or the like. After decorating, the raw glass article is then ceramicized in the well known manner. For this purpose, the article is usually converted for several hours at a temperature from about 900° to 1100° C. into the glass-ceramic article. After the conversion, the decoration will have sunk into the surface of the glass-ceramic article.

The process according to the invention succeeds only if the correct order of the treatment steps is followed, that is to say if the decoration is applied after the treatment with the Brönsted acid but before ceramicizing. If a raw glass article is treated with Brönsted acid and then ceramicized, and the decoration is then applied afterwards in a separate burning-in step to the already ceramicized article, the sinking-in of the color into the surface no longer occurs. Likewise, there is no sinking-in of the decoration color if a glass-ceramic article is subjected to the treatment with the Brönsted acid and then decorated.

The advantages obtainable by the process are above all that the decoration can be applied in greater layer thickness than hitherto possible that is to say, in layer thicknesses greater than 10 μm, whereby a better color impression can be obtained without the decoration producing excessive elevations on the glass-ceramic article. The sinking-in of the decoration also makes it possible, with appropriate thickness of the decoration or appropriate depth of sinking, to remove the decorating virtually completely from the attack by objects chafing across the surface of the glass-ceramic article.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire texts of all applications, patents and publications, if any, cited above and below, and of corresponding application Germany P 41 15 500.9-45, are hereby incorporated by reference.

EXAMPLE

A plate of a crystallizable $Li_2O$—$Al_2O_3$—$SiO_2$ glass system with the composition (see German Patent Specification 3,936,654) in % by weight of $SiO_2$ 64, $Al_2O_3$ 21.3, $Li_2O$ 3.5, $Na_2O$ 0.6, $K_2O$ 0.5, $BaO$ 2.5, $CaO$ 0.2, $MgO$ 0.1, $TiO_2$ 4.5, $ZrO_2$ 2.3, $Sb_2O_3$ 0.5, with dimensions of $400 \times 400 \times 5$ mm$^3$, was placed into a stainless steel tank of suitable size containing an aqueous saturated ammonium sulphate solution, so that the plate was immersed in the solution. The steel tank was moved into a temperature controllable muffle oven and heated within 30 minutes to about 120° C. After all the water had evaporated from the tank, which was determined by means of a thermocouple dipped into the solution, the temperature was raised to 315° C. and kept constant at that temperature for about 20 hours. The steel tank with the plate was then cooled to room temperature within about one hour and filled with such a quantity of water that the precipitated salts were dissolved. After a few minutes, the salts were dissolved and it was possible to remove the plate from the tank. To remove the last residues of the salt solution, the plate was rinsed with water, dried and then decorated by the screen printing process with a point pattern of ceramic color. The ceramic color used was a commercially available color consisting of a suspension of a powder of coloring oxides and a lead borate glass binder. The color was applied in such a thickness that a layer thickness of the decoration of about 3.5 μm resulted after burning-in. After application of the ceramic color, the glass plate was ceramicized. It was found that the decoration had sunk into the surface of the glass plate, so that the surfaces of the decoration no longer protruded beyond the surface of the glass plate.

For comparison, the example was repeated without the pretreatment with the Brönsted acid according to the invention. It was found that the decoration protruded beyond the glass surface by about 3.5 μm after burning-in. In a further comparative experiment, a ceramic plate of the same composition was first ceramicized under the conditions mentioned, this was followed by the treatment with the Brönsted acid and the decoration was then applied and burnt in. Here again, it was found that the decoration had not sunk in but protruded from the glass-ceramic plate by about 3.4 μm.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for producing a decorated glass-ceramic article which comprises the steps of decorating an article of a crystallizable glass composition with ceramic color, firing the decorated article to convert it into a glass-ceramic article with simultaneous burning-in of the ceramic color, and as a preliminary step before decorating and firing the glass article, heat treating the surface of the crystallizable glass article with a Brönsted acid at a temperature between 50° C. and 800° C., for a period of time effective to cause the ceramic color which is thereafter applied to the crystallizable glass article to sink into the surface of the glass article during the firing step.

2. A process according to claim 1, wherein the treatment of the article is carried out at temperatures between 150° and 350° C.

3. A process according to claim 1, wherein the Brönsted acid is $H_2SO_4$, $(NH_4)_2SO_4$, $NH_4HSO_4$, or an alkali metal hydrogen sulphate.

4. A process according to claim 1, wherein the treatment of the article is carried out for about 0.25 to 6 hours.

5. A process according to claim 1, wherein the treatment of the article therewith is carried out at temperatures between 150° and 350° C. for about 0.25 to 6 hours.

6. A process according to claim 1, wherein the Brönsted acid is a meltable solid salt and the article is treated with a melt thereof.

7. A process according to claim 1, wherein the Brösted acid is a water soluble salt and the process comprises the steps of coating the surface of the article which is to be decorated with an aqueous solution of the salt; evaporating the water from the coating before the heat treatment step; and after the heat treatment washing the salt coating from the surface prior to applying the ceramic color thereto.

8. A process according to claim 1, wherein the glass composition is a $Li_2O$—$Al_2O_3$—$SiO_2$ glass.

9. A process according to claim 8, wherein the Brösted acid is a meltable solid salt and the crystallizable glass article is treated with a melt thereof.

10. A process according to claim 1, wherein the Brönsted acid is $H_2SO_4$, $(NH_4)_2SO_4$, $NH_4HSO_4$, or an alkali metal hydrogen sulphate and the treatment of the article therewith is carried out at temperatures between 150° and 350° C. for about 0.25 to 6 hours.

11. In a process for producing a ceramic color decorated glass article wherein a ceramic color decoration is applied to a surface of an article formed of a crystallizable glass composition and the ceramic color is fired onto the surface simultaneously with the firing of the glass composition into a decorated glass ceramic article, the improvement which comprises the step, prior to applying the ceramic color to the surface, of heat treating the surface with a Brönsted acid at a temperature which modifies the surface of the article so that the ceramic color thereafter applied thereto sinks into the surface when the article is fired.

12. A process according to claim 11, wherein the treatment of the article is carried out at temperatures between 150° and 350° C.

13. A process according to claim 11, wherein the Brönsted acid is $H_2SO_4$, $(NH_4)_2SO_4$, or an alkali metal hydrogen sulphate.

14. A process according to claim 11, wherein the treatment of the article is carried out for about 0.25 to 6 hours.

15. A process according to claim 11, wherein the treatment of the article therewith is carried out at temperatures between 150° and 350° C. for about 0.25 to 6 hours.

16. A process according to claim 11, wherein the Brönsted acid is a meltable solid salt and the article is treated with a melt thereof.

17. A process according to claim 11, wherein the Brönsted acid is a water soluble salt and the process comprises the steps of coating the surface of the article which is to be decorated with an aqueous solution of the salt and evaporating the water from the coating before the treatment; and after the heat treatment washing the salt coating from the surface prior to applying the ceramic color thereto.

18. A process according to claim 17, wherein the Brönsted acid is a meltable solid salt and the crystallizable glass article is treated with a melt thereof.

19. A process according to claim 11, wherein the glass composition is a $Li_2O—Al_2O_3—SiO_2$ glass.

* * * * *